US009353732B2

(12) United States Patent
Gupta et al.

(10) Patent No.: US 9,353,732 B2
(45) Date of Patent: May 31, 2016

(54) METHOD OF OPERATING A WIND TURBINE AS WELL AS A SYSTEM SUITABLE THEREFOR

(75) Inventors: Amit Kumar Gupta, Singapore (SG); Anshuman Tripathi, Singapore (SG)

(73) Assignee: Vestas Wind Systems A/S, Aarhus N. (DK)

(*) Notice: Subject to any disclaimer, the term of this patent is extended or adjusted under 35 U.S.C. 154(b) by 213 days.

(21) Appl. No.: 13/996,422

(22) PCT Filed: Dec. 20, 2011

(86) PCT No.: PCT/DK2011/050502
§ 371 (c)(1), (2), (4) Date: Sep. 23, 2013

(87) PCT Pub. No.: WO2012/083963
PCT Pub. Date: Jun. 28, 2012

(65) Prior Publication Data
US 2014/0008912 A1   Jan. 9, 2014

Related U.S. Application Data

(60) Provisional application No. 61/426,543, filed on Dec. 23, 2010.

(30) Foreign Application Priority Data

Dec. 23, 2010   (DK) .................................. 2010 70581

(51) Int. Cl.
*H02H 3/20* (2006.01)
*F03D 9/00* (2016.01)
*H02J 3/38* (2006.01)

(52) U.S. Cl.
CPC .............. *F03D 9/003* (2013.01); *H02J 3/386* (2013.01); *Y02E 10/763* (2013.01)

(58) Field of Classification Search
CPC .................................. H02J 3/386; F03D 9/003
See application file for complete search history.

(56) References Cited

U.S. PATENT DOCUMENTS 5,389,749 A * 2/1995 Hokari et al. ................. 187/293
6,819,070 B2 * 11/2004 Kerkman et al. ............. 318/434
(Continued)

FOREIGN PATENT DOCUMENTS

CN   101252336 A   8/2008
EP   1863162 A2   12/2007

OTHER PUBLICATIONS

Holtz J et al: "On continuous control of PWM inverters in the overmodufation range including the six-step mode", Power Electronics and Motion Control. San Diego, Nov. 9-13, 1992; [Proceedings of the International Conference on Industrial Electronics, Control, Instrumentation and Automation (IECON)], New York, IEEE, U.S., vol. CONF. 18, Nov. 9, 1992, pp. 307-312, XP010060705, DOI: 10.1109/IECON. 1992.254615; ISBN: 978-0-7803-0582-3, the whole document.

(Continued)

*Primary Examiner* — Thienvu Tran
*Assistant Examiner* — Tien Mai
(74) *Attorney, Agent, or Firm* — Patterson + Sheridan, LLP

(57) ABSTRACT

According to a method of the present invention, a method of operating a wind turbine comprising a power generator, a generator side converter connected to the power generator, a line side converter connected to a power grid through power components, and a DC-link connected between the generator side converter and the line side converter is provided, the method comprising: monitoring the grid voltages on the power grid for overvoltage events; if an overvoltage event is detected, operating the line side converter in an overmodulation range for at least a part of the duration of the overvoltage event.

20 Claims, 15 Drawing Sheets

(56) References Cited

U.S. PATENT DOCUMENTS

| | | |
|---|---|---|
| 2010/0091417 A1 | 4/2010 | Letas |
| 2010/0134935 A1 * | 6/2010 | Ritter et al. |
| 2010/0157632 A1 * | 6/2010 | Batten et al. .................... 363/74 |
| 2010/0207463 A1 | 8/2010 | Fortmann et al. |

OTHER PUBLICATIONS

International Search Report, PCT/DK2011/050502, May 29, 2012.
DK Search Report, PA201070581, Jun. 27, 2011.

* cited by examiner a)

b)

METHOD OF OPERATING A WIND TURBINE AS WELL AS A SYSTEM SUITABLE THEREFOR

BACKGROUND

The present invention relates to a method of operating a wind turbine. Further, the present invention relates to a system of controlling operation of a wind turbine. Finally, the present invention relates to a wind turbine.

In recent years, it has become an important aspect of grid codes to properly handle overvoltage occurring on power grids to which the wind turbines are connected. That is, wind turbines should be capable of staying connected to the power grids or ride through even in the case of grid overvoltage.

Overvoltages are gaining attention from wind farm owners and wind turbine manufacturers due to the large amount of sensitive power electronics in frequency converter wind turbines. The transmission system operators are also interested in this phenomenon, since situations in the grid connection system of offshore wind farms have occurred where the insulation systems have been stressed in situations never experienced before. Overvoltages as high as 2 p.u. have been observed. In these events, the main-circuit breaker tripped the wind farm cable at the on-land connection point and left the wind farm in isolated operation with the cable and the wind farm transformer. Although such events are rare, this represents a risk of damaging the equipment. The Danish transmission system operator thus performed investigations of such overvoltage in connection with the planning of new offshore wind farms. These investigations have shown that the overvoltage levels are influenced by many parameters, including operational characteristics of the Wind Turbine Generators (WTG) prior to the disconnection, protection systems, control and the accuracy of the representation of the cable and the transformers in the relevant frequency range.

It is desirable to provide over voltage ride through methods for wind turbines which are highly effective and easy to implement.

SUMMARY OF THE INVENTION

According to an embodiment of the present invention, a method of operating a wind turbine comprising a power generator, a generator side converter connected to the power generator, a line side converter connected to a power grid through power components, and a DC-link connected between the generator side converter and the line side converter is provided, the method comprising: monitoring the grid voltages on the power grid for overvoltage events; if an overvoltage event is detected, operating the line side converter in an overmodulation range for at least a part of the duration of the overvoltage event.

According to an embodiment of the present invention, during the overmodulation range, the line side converter is operated in a non-linear region extending between an upper end of a linear modulation range and six step operation.

According to an embodiment of the present invention, in the overmodulation range, more than 90% and less than 100% of the available DC-link voltage is used by the line side converter control.

According to one embodiment, current reference signals for current control in modulation range are modified to generate a line current reference signal based on at least one of the following: grid voltage, converter reference voltage vector, grid current injection requirements, active power requirement and reactive power requirement. The first line current reference could be higher than nominal converter current rating to allow short time handling of overvoltage though operating the converter at higher current. The current reference signal is for example substantially a reactive current signal and an active current signal is for example substantially equal to zero.

According to an embodiment of the present invention, during the overmodulation range, the line side converter is operated using vector based control.

According to an embodiment of the present invention, the line side converter is operated using compensated PI current control.

According to an embodiment of the present invention, the method further comprises: obtaining a line side current signal indicative of a line current occurring at the output terminals of a line side converter connected to the grid transformer through power components; estimating a harmonic current component signal indicative of a harmonic current component present in the line current; subtracting the estimated harmonic current component signal from the obtained line current signal to find a second line current signal which is substantially free from the harmonic current component; determining a line current error between the second line current signal and a line current reference signal which is generated in dependence on the overvoltage event detected; controlling, based on the determined line current error, the line side converter such that the line current error is partly or fully compensated. The proposed current control can be done in both the stationary fame and the rotating frame. The line current reference signal may be generated by modification of current reference signals for current control in modulation range as described above.

According to an embodiment of the present invention, during the overmodulation range, the line side converter currents are substantially reactive.

According to an embodiment of the present invention, a system of operating a wind turbine comprising a power generator, a generator side converter connected to the power generator, a line side converter connected to a power grid through power components, and a DC-link connected between the generator side converter and the line side converter is provided, the system comprising: a monitoring unit configured to monitor grid voltages on the power grid for overvoltage events; a controlling unit connected to the monitoring unit and configured to control, if an overvoltage event is detected, operation of the line side converter in an overmodulation range for at least a part of the duration of the overvoltage event.

According to an embodiment of the present invention, the controlling unit is configured to control, during the overmodulation range, the line side converter to operate in a non-linear region extending between an upper end of a linear modulation range and six step operation.

According to an embodiment of the present invention, the controlling unit is configured to control, in the overmodulation range, the line side converter such that more than 90% and less than 100% of the available DC-link voltage is utilized by the line side converter control.

According to one embodiment, the system further comprises a modification unit configured to modify current reference signals to generate a first line current reference signal based on at least one of the following: grid over voltage, grid current, active power requirement and reactive power requirement.

According to an embodiment of the present invention, the controlling unit is configured to control, during the overmodulation range, the line side converter using vector based control.

According to an embodiment of the present invention, the controlling unit is configured to control, during the overmodulation range, the line side converter using compensated PI current control.

According to an embodiment of the present invention, the controlling unit comprises: a line current signal obtaining unit configured to obtain a line current signal indicative of a line current occurring at the output terminals of a line side converter connected to the grid transformer through power components; a harmonic current component signal estimating unit configured to estimate a harmonic current component signal indicative of a harmonic current component present in the line current; a subtracting unit configured to subtract the estimated harmonic current component signal from the obtained line current signal to find a second line current signal which is substantially free from the harmonic current component; a line current error determining unit configured to determine a line current error between the second line current signal and a line current reference signal which is generated in dependence on the overvoltage event detected; wherein the controlling unit is configured to control, based on the determined line current error, the line side converter such that the line current error is partly or fully compensated. The line current reference signal may be the one generated by the modification unit as described above.

According to an embodiment of the present invention, a wind turbine comprising a system according to any one of the preceding embodiments is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
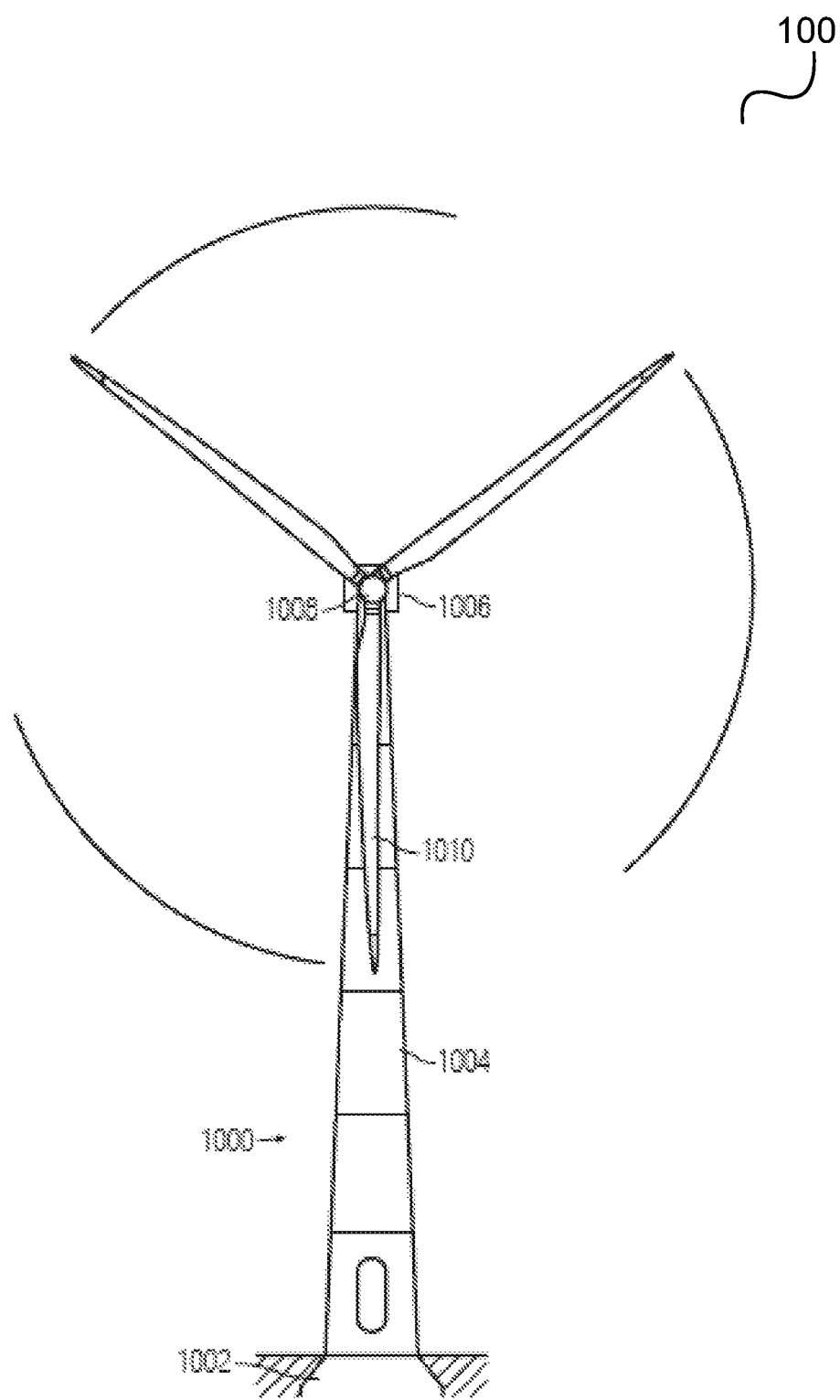
FIG. 1 shows a schematic drawing of a wind turbine according to an embodiment of the present invention.

FIG. 1 illustrates a common setup of a wind turbine 1000 which may use the inventive method/system as described below. The wind turbine 1000 is mounted on a base 1002. The wind turbine 1000 includes a tower 1004 having a number of tower sections. A wind turbine nacelle 1006 is placed on top of the tower 1004. The wind turbine rotor includes a hub 1008 and at least one rotor blade 1010, e.g. three rotor blades 1010. The rotor blades 1010 are connected to the hub 1008 which in turn is connected to the nacelle 1006 through a low speed shaft which extends out of the front of the nacelle 1006.

Figure 2:
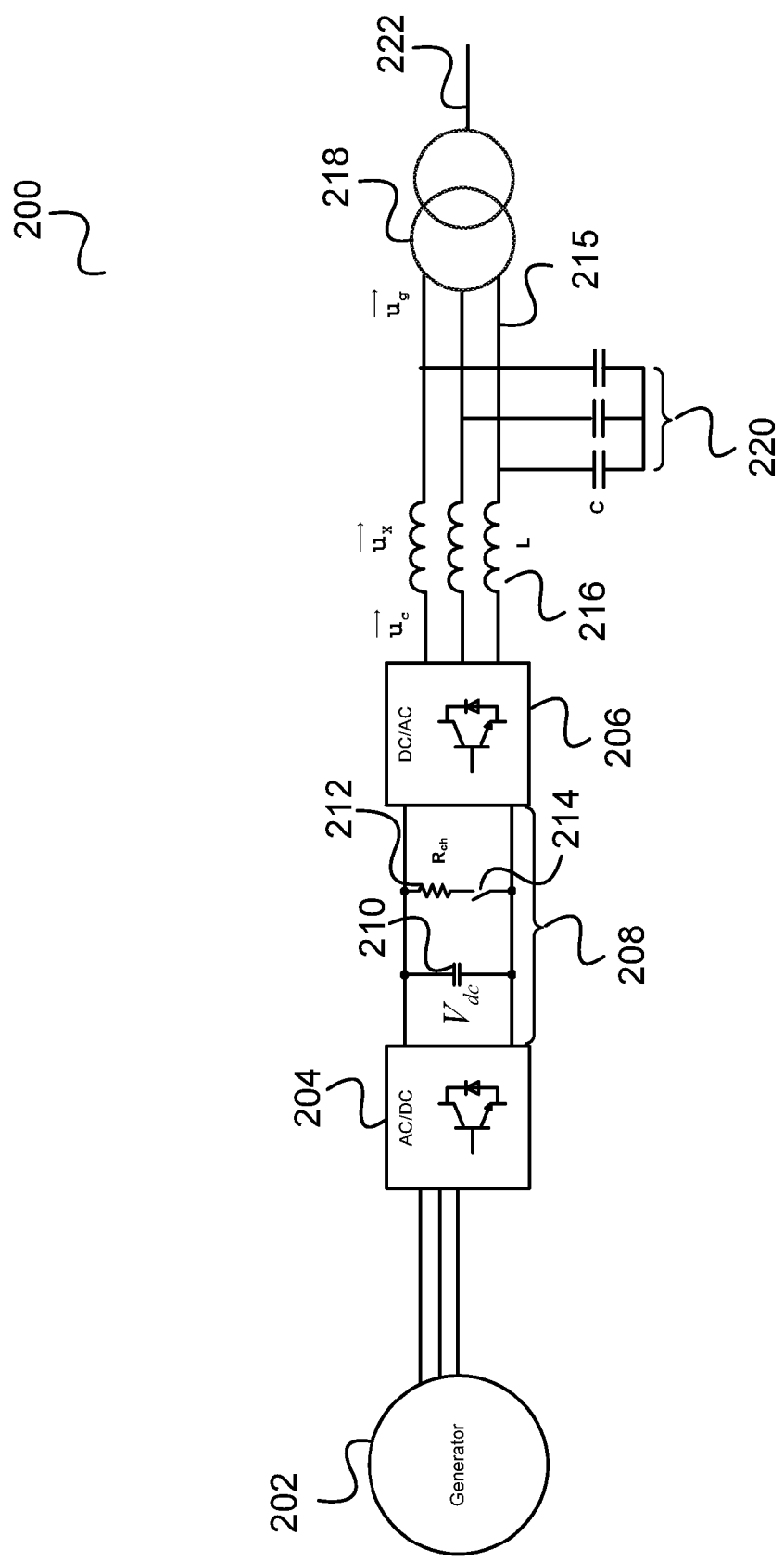
FIG. 2 shows a schematic drawing of a drive train system used for operating a conventional wind turbine generator.

FIG. 2 shows a schematic drawing of a controlling system 200 used for controlling operation of a conventional wind turbine. The wind turbine comprises a generator 202, an AC/DC (generator or machine side) converter 204, an DC/AC (line or grid side) converter 206, and a DC-link 208 connected between the AC/DC converter 204 and the DC/AC converter 206. Output terminals of the generator 202 are connected to input terminals of the AC/DC converter 204. A first end of the DC-link 208 is connected to the output terminals of AC/DC converter 204, and the opposite end of the DC-link 208 is connected to input terminals of the DC/AC converter 206. The DC-link 208 comprises a DC-link capacitor 210 as well as a DC-link resistor 212 (also known as a load dump resistor or a chopper resistor). The DC-link resistor 212 can be activated/deactivated (connected between two arms of the DC-link 208 or disconnected therefrom) via a switch 214. The switch 214 is a power electronic switch according to an embodiment. Output terminals of DC/AC converter 206 are connected via a power line 215 including inductors/chokes 216 to a grid transformer 218. A filter system 220 for filtering out switching harmonics is connected to the power line 215. The filter system may also contain a resonance damping branch (not shown) to avoid resonance phenomenon.

During normal operation, the switch 214 is open and active power from the power generator flows through the line side converter, the machine side converter and grid transformer to the power grid. Both the converters are switching (i.e. they are in active operation). Depending on the control algorithm being used for controlling the converters and the converter hardware ratings, they can withstand some grid overvoltage e.g. 1.1-1.25 pu. The grid overvoltages may be handled by absorbing reactive power as will be described in FIG. 3. However, there is a maximum voltage $u_{c(max)}$ after which the converter cannot be controlled to handle the grid overvoltage anymore as will be described with FIG. 4. At this maximum voltage $u_{c(max)}$, the whole converter voltage and current capacities are used to absorb maximum reactive power.

In normal condition if the grid voltage is higher than what a line side converter can handle it may start charging the DC-link through the line side converter which acts as a rectifier now. This may lead to unintended tripping of the converter system/wind turbine. It might also cause damage to the power components.

Figure 3:
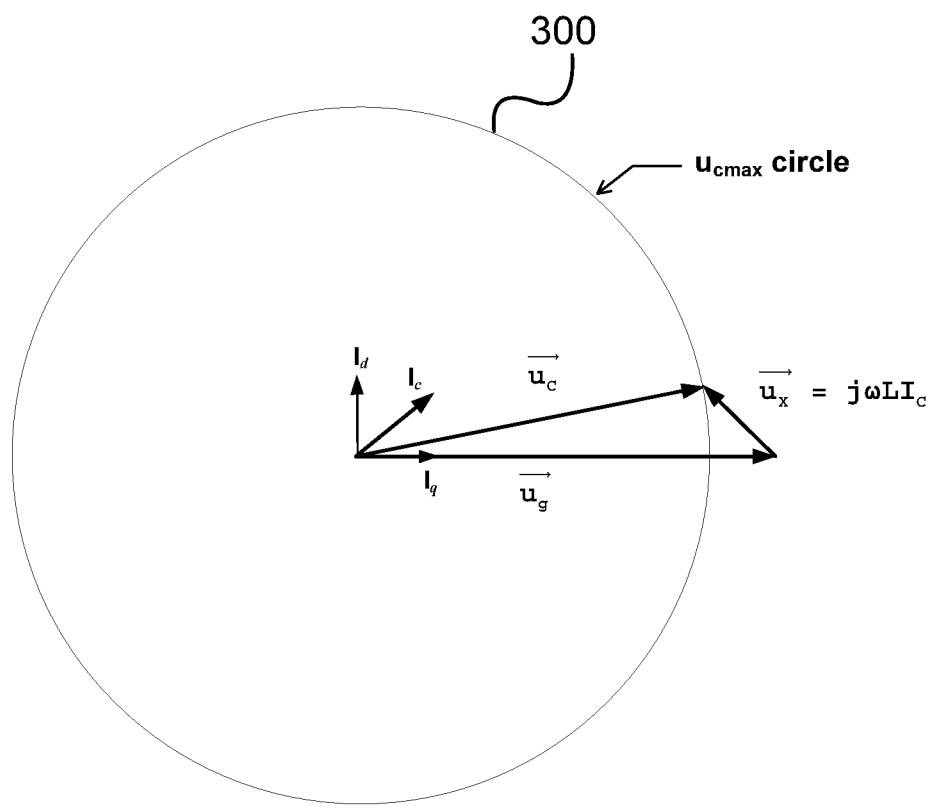
FIG. 3 shows a vector diagram illustrating the case that reactive power is absorbed through the DC/AC converter for slight overvoltage.

FIG. 3 shows the relationship between the voltages $\vec{u}_g$, $\vec{u}_c$ and $\vec{u}_x$ which occur at positions of the power line 215 as indicated in FIG. 2. As can be seen from FIG. 3, in an overvoltage event, a grid transformer voltage $\vec{u}_g$ is larger than a maximum voltage $\vec{u}_c$ of the DC/AC converter 206 which is obtained though the maximum utilization of DC-link voltage $V_{dc}$ represented by the outer circumference of the circle 300 shown in FIG. 3. In order to balance this overvoltage (i.e. in order to ensure that $\vec{u}_c = \vec{u}_g + \vec{u}_g$), the DC/AC converter 206 (line side converter) is operated such that a reactive power is absorbed, leading to a converter current vector $I_c$ at output terminals of the DC/AC converter 206 comprising a reactive current component $I_d$ and an active current component $I_g$. The reactive current component $I_d$ and the active current component $I_g$ of the converter current $I_c$ are chosen such that the voltage $\vec{u}_x$ drop across the inductors 216 ("grid choke voltage") is equal to the vector difference between the grid transformer voltage $\vec{u}_g$ and the converter voltage $\vec{u}_c$, as shown in FIG. 3. In the situation shown in FIG. 3 the converter current $I_c$ still comprises an active current component $I_g$.

Figure 4:
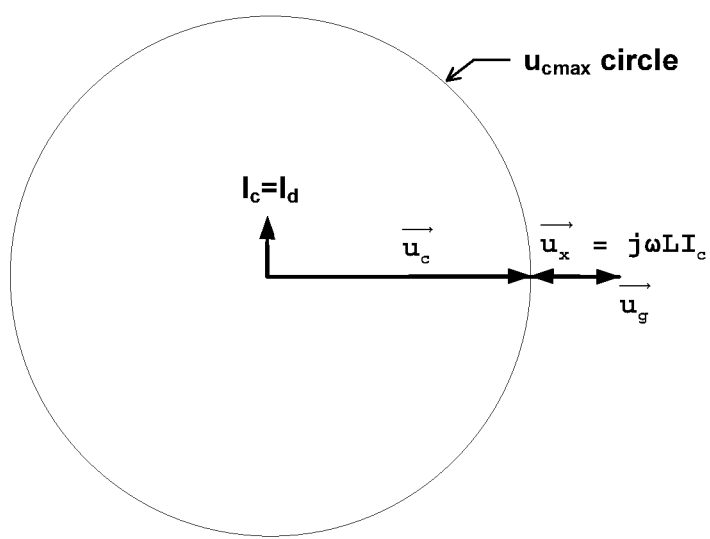
FIG. 4 shows a vector diagram illustrating the case that reactive power is absorbed through the DC/AC converter for maximum overvoltage that can be handled in this way.

FIG. 4 shows an overvoltage scenario in which, compared to the scenario shown in FIG. 3, the grid transformer voltage $\vec{u}_g$ is increased. The overvoltage scenario shown in FIG. 4 is the maximum grid transformer voltage $\vec{u}_g$ that can be handled by the DC/AC converter 206 by balancing the voltages by absorbing reactive power. However, in order to balance the overvoltage in this case, the converter current $I_c$ injected at the output terminals of the DC/AC converter 206 only contains a reactive current component $I_d$, i.e. no active current component $I_q$.

Figure 5:
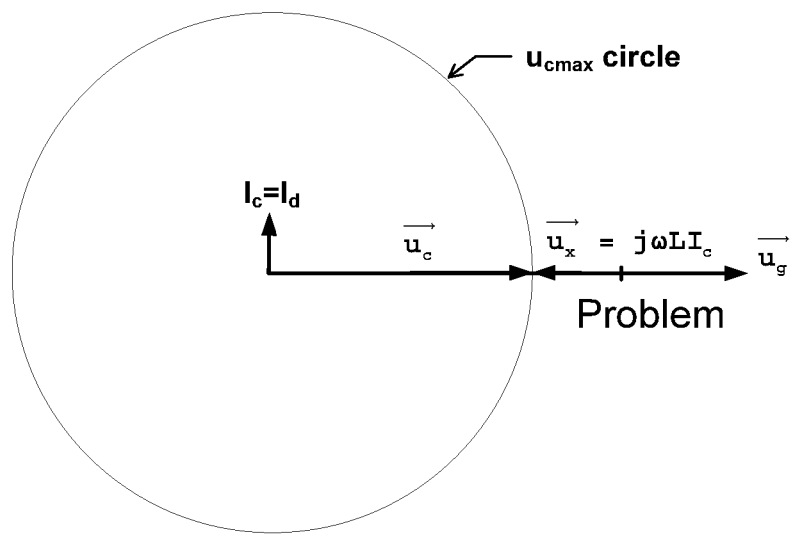
FIG. 5 shows a vector diagram illustrating the case of an overvoltage event which cannot be handled by absorbing reactive power through the DC/AC converter.
Figure 5:
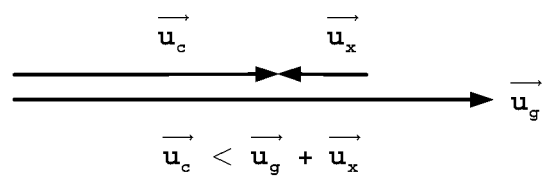

FIG. 5 shows a overvoltage scenario in which the overvoltage is so high that even the maximum converter current $I_c$ and voltage $\vec{u}_c$ which can be output by the DC/AC converter 206 is not sufficient for balancing the overvoltage. As a result of this condition, active operation (active switching) of the DC/AC converter 206 is stopped, meaning that the DC/AC converter 206 now acts as a passive rectifier. As a consequence, the DC-link voltage $V_{dc}$ increases which may result in unintentional tripping of the wind turbine.

Embodiments of the present invention aim to solve the overvoltage scenario shown in FIG. 5, i.e. aim to provide a solution to keep the wind turbine connected to a power grid even if an overvoltage scenario as shown in FIG. 5 occurs.

Figure 6:
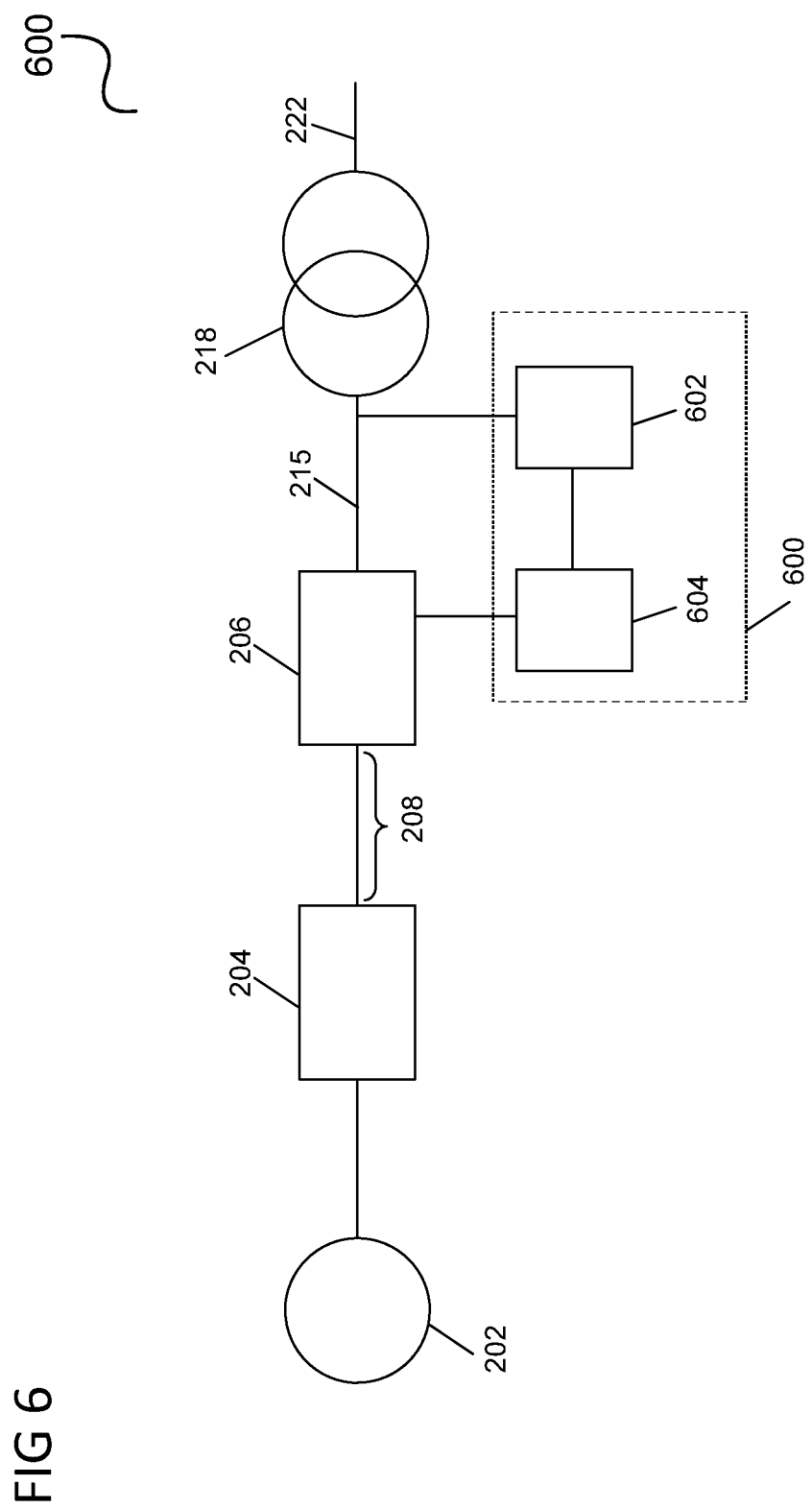
FIG. 6 shows a converter control system for the wind turbine drive train according to an embodiment of the present invention.

FIG. 6 shows a schematic drawing of a system of operating a wind turbine according to an embodiment of the present invention. A control system 600 of operating a wind turbine comprising a power generator 202, a generator side converter 204 connected to the power generator 202, a line side converter 206 connected to a power grid 222 through power components, and a DC-link 208 connected between the generator side converter 204 and the line side converter 206 is provided, the system 600 comprising: a monitoring unit 602 configured to monitor grid voltages on the power grid 222 for overvoltage events; a controlling unit 604 connected to the monitoring unit 602 and configured to control, if an overvoltage event is detected, the operation of the line side converter 206 in an overmodulation range for at least a part of the duration of the overvoltage event.

Figure 7:
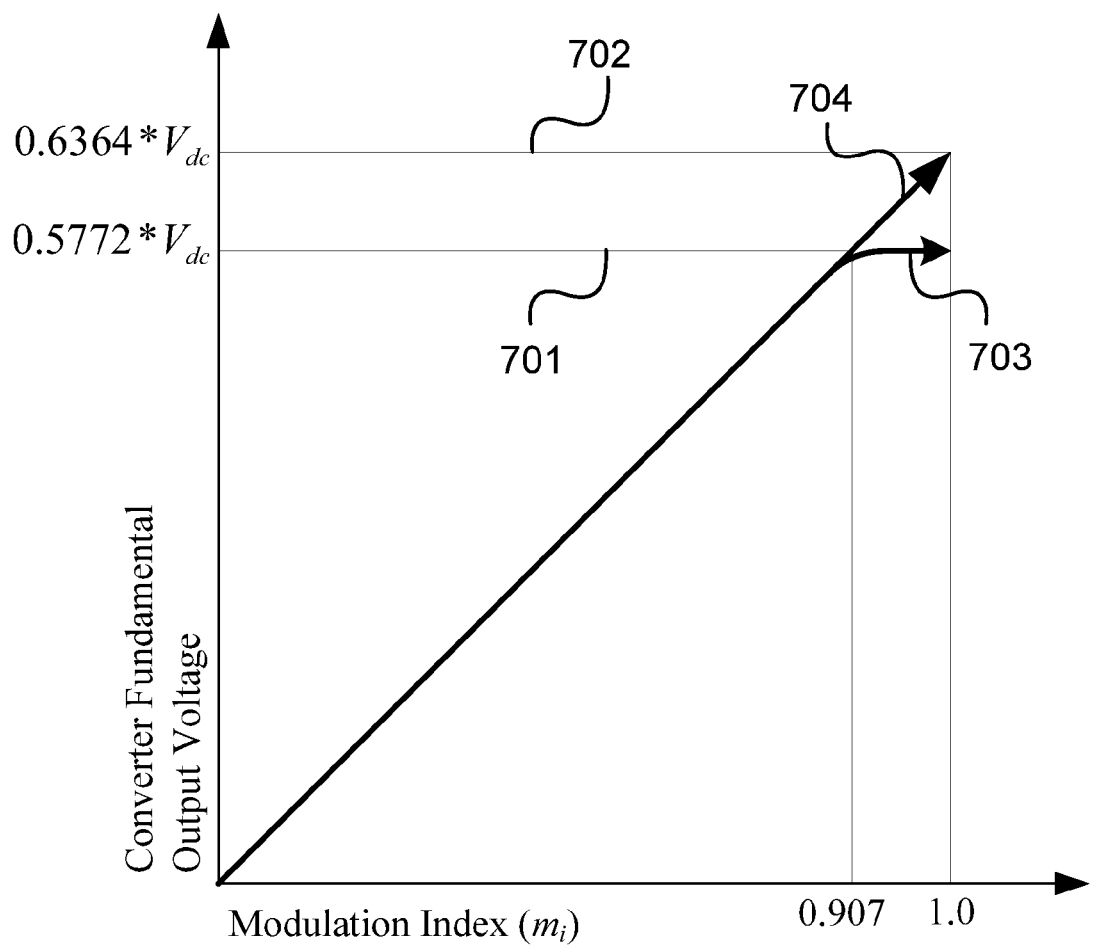
FIG. 7 shows a graph illustrating the linear modulation region and the overmodulation range through varying the modulation index with converter fundamental output voltage.

FIG. 7 shows the relationship between the modulation index ($m_i$) and the fundamental output voltage for the line side converter. The modulation index can be expressed as $$m_i = \frac{u_1}{(2/\pi)V_{dc}}$$

and varies between 0 and 1. In the range $0 \leq m_i < 0.907$, the converter is said to operate in a linear modulation range as shown by a first (smaller) square 701. Linear operation range means that the converter produces required fundamental voltage along with switching harmonics but no low order harmonics are generated. The maximum voltage that can be produced by the converter is $$\frac{2}{\pi}V_{dc}$$

(i.e. $0.6364 V_{dc}$). In linear modulation range the converter can produce only 90.7% of the maximum possible output voltage i.e.

$$0.907 * \frac{2}{\pi}V_{dc} = 0.5772 * V_{dc}.$$

The higher voltage from the converter can be produced by operating in overmodulation range i.e. $0.907 \leq m_i < 1.0$ which corresponds to the area between the first square 701 and a second (larger) square 702. Overmodulation range means that the converter produces required fundamental voltage along with switching harmonics and lower order harmonics. When $m_i = 1.0$ the converter is said to operate in six-step operation.

It should be noted that if the converter is not operated in the overmodulation range, then increase in the modulation index beyond 0.907 does not increase the converter output voltage, i.e. the output voltage saturates. This is shown by a first arrow 703. However if the converter is operated in the overmodulation range, the output voltage increases with modulation index beyond 0.907 as shown by a second arrow 704.

Figure 8:
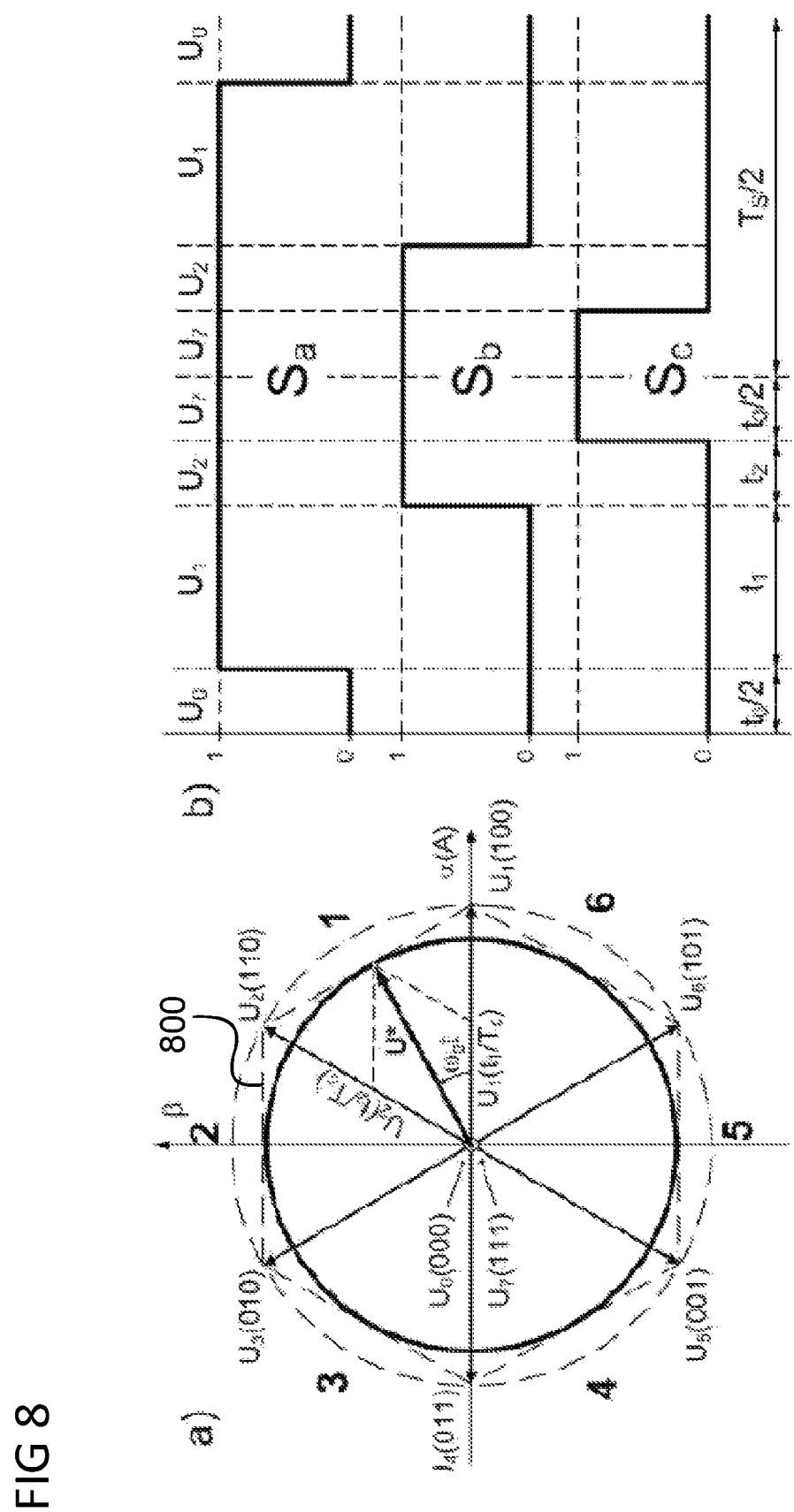
FIG. 8a illustrates the principle of space vector modulation in the linear modulation range.
FIG. 8b shows the operating times and switching states of the switches of the DC/AC converter corresponding to the reference vector shown in FIG. 8a FIG. 9 illustrates the operation of an DC/AC converter in the overmodulation range.

FIG. 8a illustrates the operation of an DC/AC converter in the linear modulation range 700. In this operation mode, the voltage reference vector $\vec{u}^*$ may touch the hexagon 800 spanned by the switching state vectors $\vec{u}_1^*$ to $\vec{u}_6^*$ in a $\alpha\beta$ representation, however does not reach beyond the hexagon. Only 90.7% of the DC-link voltage is used by the line side converter. FIG. 8b shows the operating times of the switches of the converter corresponding to the reference vectors shown in FIG. 8a. This depends on the modulation strategy of the converter. In FIG. 8b, $t_0 + t_1 + t_2 = T_s/2$ where switching times $t_0$, $t_1$ and $t_2$ are the on-time durations for which the switching vectors $\vec{u}_0^*$, $\vec{u}_1^*$ and $\vec{u}_2^*$ will be switched respectively, and $T_s$ is the switching period. On-times are calculated as per equation [0] based on the location of the reference vector $\vec{u}^*$ in FIG. 8a.

$$t_1 = \frac{2\sqrt{3}}{\pi}|u^*|T_s\mathrm{Sin}\left(\frac{\pi}{3} - \theta\right) \quad (0)$$

$$t_2 = \frac{2\sqrt{3}}{\pi}|u^*|T_s\mathrm{Sin}(\theta)$$

$$t_0 = T_s - t_1 - t_2$$

Figure 9:
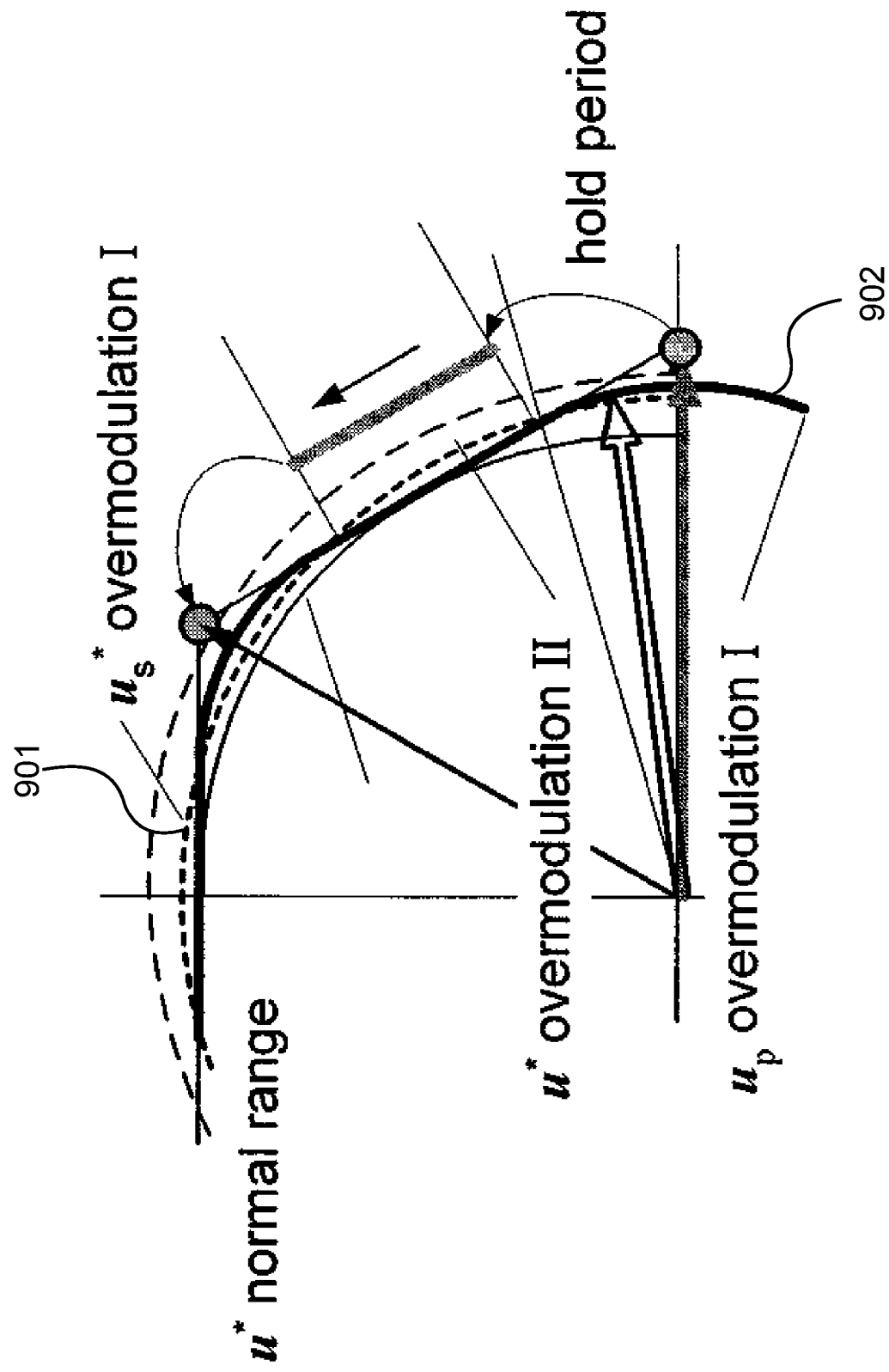

FIG. 9 illustrates the operation of a DC/AC converter in the overmodulation range. The voltage reference vector $\vec{u}^*$ partly reaches beyond the hexagon 800 spanned by the switching state vectors $\vec{u}_1^*$ to $\vec{u}_6^*$ in a αβ representation. Depending on the voltage reference vector $\vec{u}^*$ or the modulation index, there are two modes of overmodulation: mode I ($0.907 \leq m_i < m_{iOVM}$) and mode II ($m_{iOVM} \leq m_i < 1$). The value of $m_{iOVM}$ depends on overmodulation strategy and typically lies between 0.950-0.955. The switching strategies used in these two overmodulation modes are different due to non-linearity of overmodulation range. In mode I of the overmodulation range, the equation (0) is still valid but the magnitude of the reference voltage vector is increased to obtain the required voltage while the angle is kept same. Hence, the modified reference voltage vector rotates with uniform angular velocity. As the magnitude of the reference voltage vector increases into overmodulation mode I, the reference voltage vector lies outside the hexagon for some portion of the fundamental period while remaining within the hexagon for the rest of the period, seen dashed line 901 in FIG. 9. The fundamental component of the modified voltage vector $u_p$ should be equal to the actual reference vector $u^*$, where the actual reference voltage has only the fundamental component. If modulation is carried out using this technique the voltage generated is distorted and follows the modified reference voltage vector $u_p$, seen as thick dark line 902 in FIG. 9. Overmodulation mode I achieves its maximum voltage when the modified reference voltage vector travels along the hexagon with uniform angular velocity. To increase the modulation index further, the angle of the modified reference vector is changed, hence, its angular velocity becomes non-uniform. At the end of mode I, the real component of the reference voltage changes from sinusoid to a piecewise-linear waveform. After this stage, any further increase in the fundamental component of reference voltage is possible only if the area under the voltage time curve is increased. According to the fundamental principle of PWM, it is attempted to achieve the equal volt-time area for both the reference and the switching state voltage vectors. To achieve a large volt-time area for a switching state vector, one of the active switching state vectors is held on for a certain duration. The details on two modes of overmodulation range and six step operation can be referred to in [i]-[iii].

Figure 10:
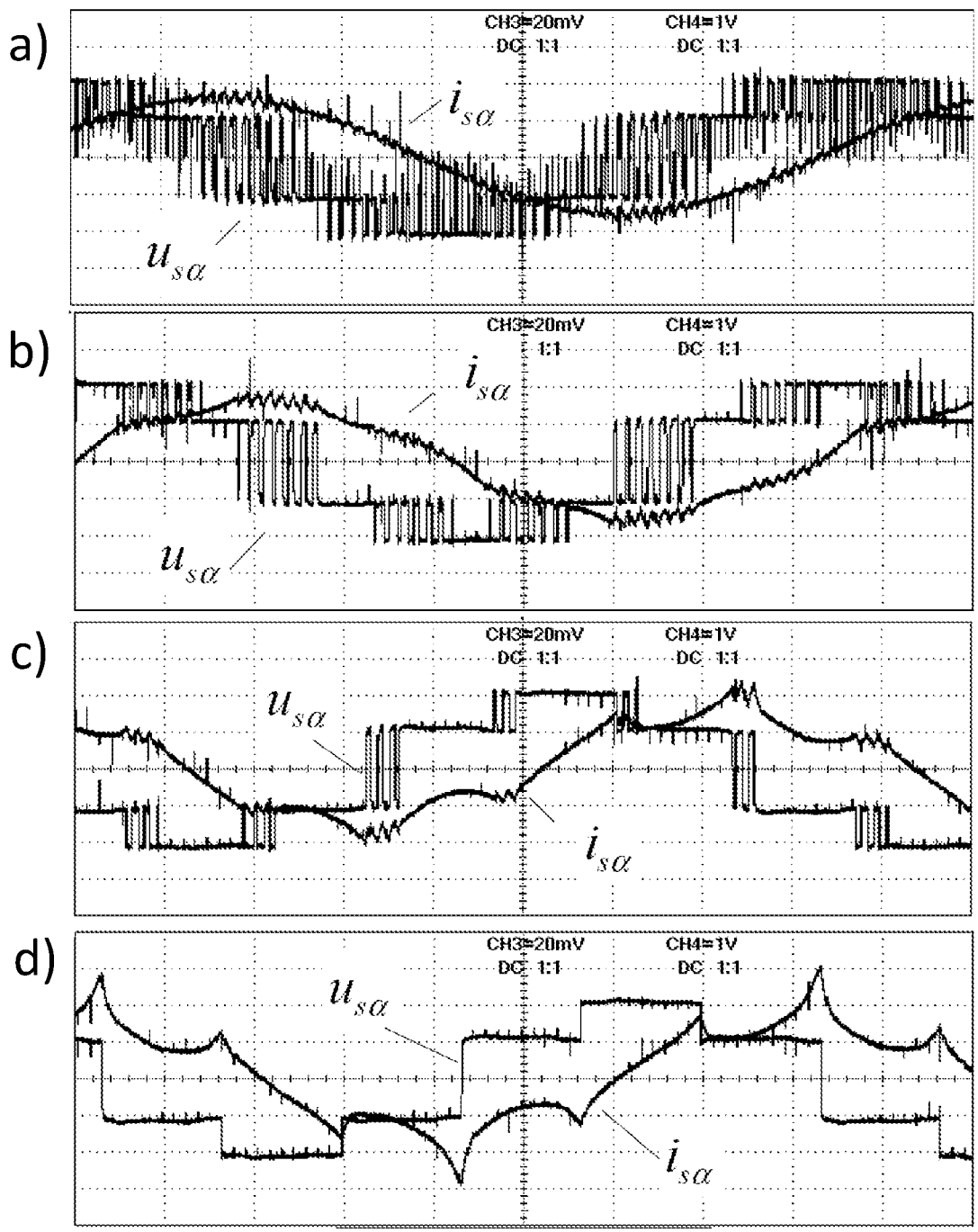
FIGS. 10a to 10d show an exemplary converter output phase voltage and current waveforms in the linear and overmodulation range

FIGS. 10a to 10d show an exemplary converter output phase voltage and current waveforms in the linear and overmodulation range for a given load at switching frequency of 1.5 kHz at various modulation indices. These waveforms were taken from the articles [iii]-[iv]. FIG. 10a shows the converter output phase voltage and current waveform at the modulation index of 0.906 corresponding to the linear operation mode. FIG. 10b shows the converter output phase voltage and current waveform at the modulation index of 0.94 corresponding to the overmodulation mode I. FIG. 10c shows the converter output phase voltage and current waveform at the modulation index of 0.985 corresponding to the overmodulation mode II. FIG. 10d shows the converter output phase voltage and current waveform at the modulation index of 1.0 corresponding to the six step operation. As can be seen from the current and voltage waveforms of FIG. 10a to FIG. 10d, the low order harmonics increase with the increase in modulation index and are at maximum at the six step operation.

Figure 11:
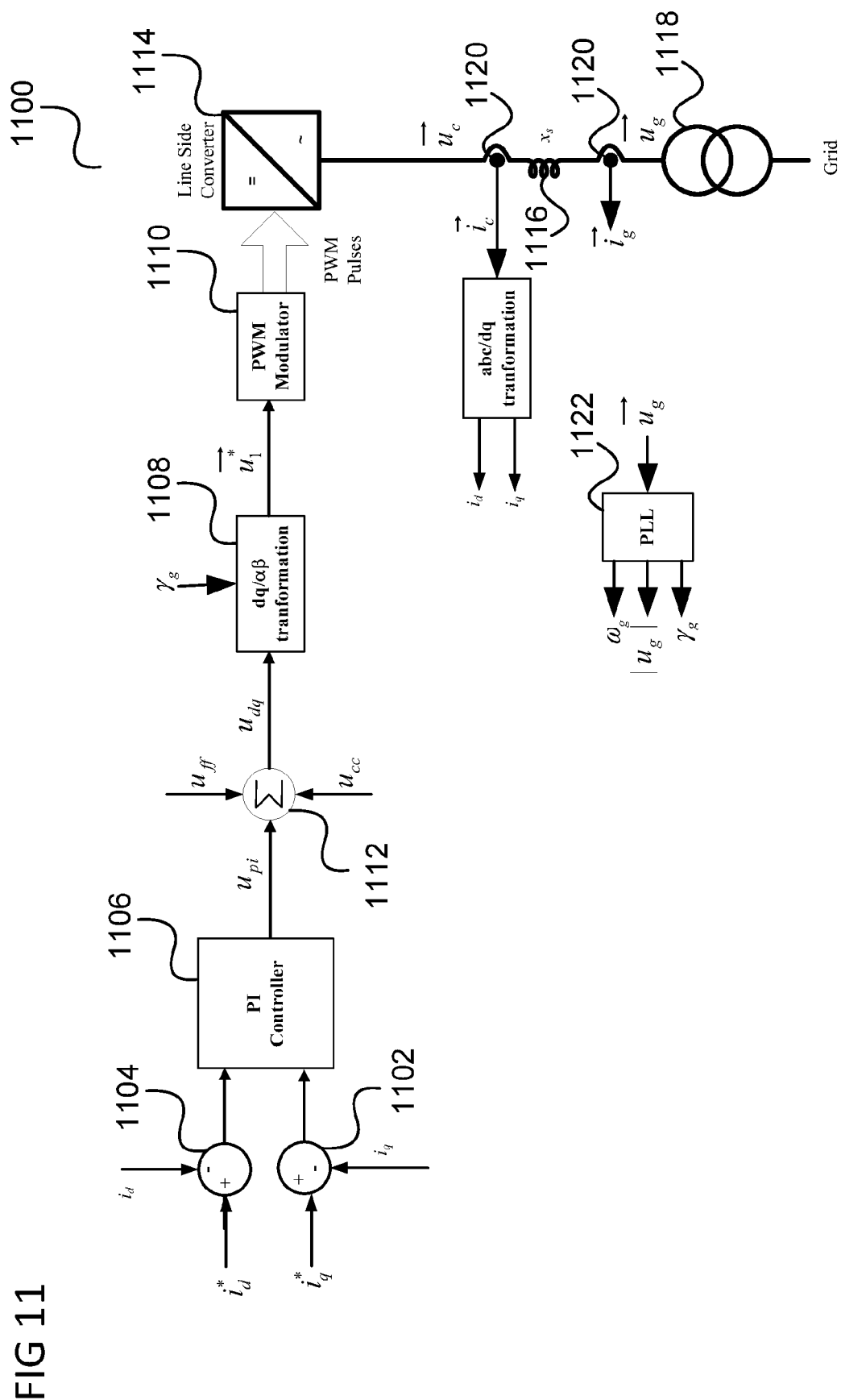
FIG. 11 shows a control system 1100 according to an embodiment of the present invention.

FIG. 11 shows a system 1100 of controlling the line side converter in rotating or dq frame. The system 1100 comprises a first subtraction unit 1102, a second subtraction unit 1104, a current control unit 1106, an adding unit 1112, a conversion unit 1108, and a pulse width modulation (PWM) unit 1110. The first subtraction unit 1102 determines a difference between an active grid current component $i_q$ and an active grid current component reference $i_q^*$. The second subtraction unit 1104 determines a difference between a reactive grid current component $i_d$ and a reactive grid current component reference $i_d^*$. The differences thus determined are supplied to a current control unit 1106. The current control unit here is a conventional PI based control. However, other implementations of the current control unit are possible. The current control unit 1106 determines, based on the supplied differences, a voltage $u_{pi}$ in a dq frame. The $u_{pi}$ is added to a feed forward voltage $u_{ff}$ and a cross coupling voltage $u_{cc}$, generating a line side converter reference voltage in dq frame $u_{dq}$. The feed forward voltage $u_{ff}$ is essentially the grid voltage in dq frame which is obtained from 1122 and could be given as $u_{gdq}[u_{gd}, u_{gq}]$. The magnitude of grid voltage is given as $|u_g|$ from 1122. The voltage $u_{dq}$ is supplied to a conversion unit 1108 which converts the converter reference voltage $u_{dq}$ from the dq frame into a αβ frame using the grid voltage angle $\gamma_g$, thereby obtaining a converter reference voltage $\vec{u}_1^*$ in the αβ frame. The grid voltage angle $\gamma_g$ normally corresponds to positive sequence voltage angle and is obtained through a phase lock loop (PLL) 1122. The converter reference voltage $\vec{u}_1^*$ is supplied to a pulse width modulator i unit 1110 which converts the converter reference voltage $\vec{u}_1^*$ into corresponding PWM (pulse width modulation) signals which are supplied to the line side converter 206. The line side converter 206 generates an output voltage in accordance with the converter reference voltage $\vec{u}_1^*$. As a result, an active converter current and a reactive converter current flowing through the power line 215 correspond to the active converter current reference $i_q^*$ and the reactive converter current reference $i_d^*$, respectively.

The power circuit in FIG. 11 is shown with thick lines, and comprises a line side converter 1114, a grid choke $x_s$ 1116 and a grid transformer 1118. The power circuit also comprises a plurality of current sensors 1120. There are also voltage sensors. The converter output voltage ($\vec{u}_c$) are normally estimated. The converter currents ($\vec{u}_c$), grid current ($\vec{i}_g$) and grid voltage ($\vec{u}_g$) are normally measured. The grid voltage ($\vec{u}_g$) is used as input to a phase lock loop (PLL) 1122 to determine grid voltage angular speed ($\omega_g$), grid voltage angle ($\gamma_g$) and grid voltage magnitude ($|u_g|$) as the grid voltage magnitude $|u_g|$ comprises d and q axis positive sequence voltages $u_{gd}$ and $u_{gq}$. The same can be applied to the negative sequence voltages.

The active current reference $i_q^*$ is normally produced by a DC-link voltage controller (not shown) and is related to the active power requirement from the grid and also the availability of wind. The active current reference $i_q^*$ is also affected by grid and converter operating conditions. For example, sometimes it is not allowed to transmit all of the generator active power into the grid, and when this happens, $i_q^*$ is reduced and some active power is directed to the DC-link resistor (212 in FIG. 2) to be dissipated. The reactive current reference $i_d^*$ is normally associated with reactive power requirement in the grid. Normally, $i_d^*$ is generated by reactive power control.

Figure 12:
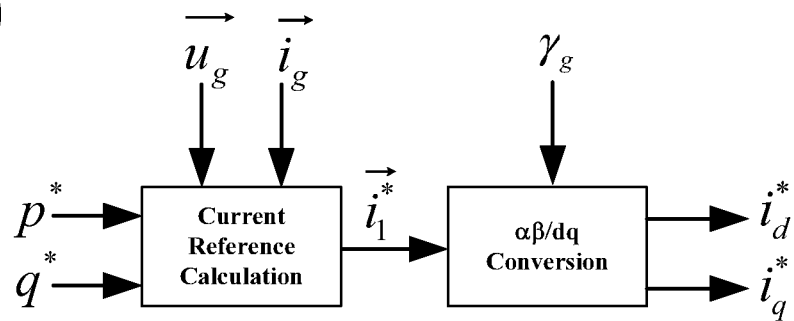
FIG. 12a illustrates the generation of a current reference according to an embodiment of the present invention.
FIG. 12b illustrates the modification of the current reference according to an embodiment of the present invention.
Figure 12:
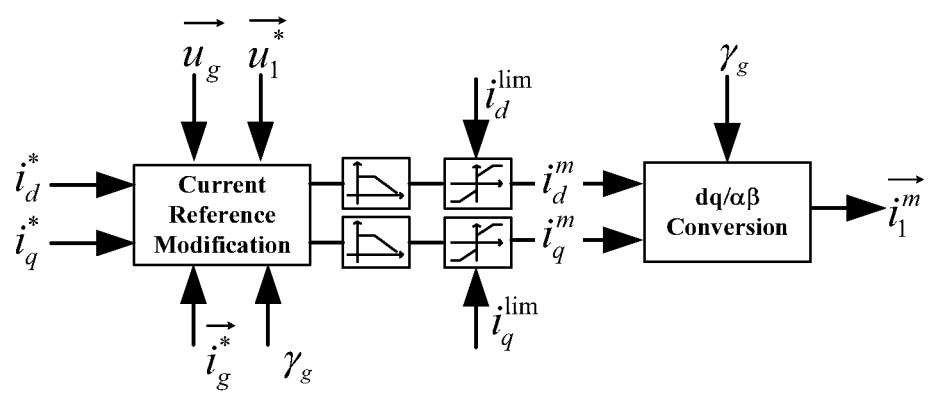

FIG. 12a illustrates the generation of current reference $\vec{i}_1^*(i_d^*, i_q^*)$ in the healthy grid conditions. The main inputs to the current reference generation blocks are active power reference (p*), reactive power reference (q*), grid voltage ($\vec{u}_g$) and grid current ($\vec{i}_g$).

As mentioned earlier, in healthy/normal grid conditions, the current references are determined through FIG. 12a. These current reference $i_d^*$ and $i_q^*$ are the provided for the current control described in FIG. 11. However, in abnormal grid conditions such as overvoltage conditions, the current references need to be modified to support the grid. This is because during overvoltage conditions, the control system 1100 shown in FIG. 11 is being operated in the overmodulation range and low order harmonics are introduced which may not be properly handled by the control system 1100.

Current reference modification depends on the situation. During the slight overvoltage condition in FIG. 3, the line side converter is operated in linear modulation region only. During the situation in FIG. 4 which correspond to the end of linear modulation region, the maximum possible reactive power is absorbed to handle the overvoltage. In this condition, it is assumed that all the active power from the generator goes to the DC-link resistor. Hence, the active current reference will be substantially zero and reactive current reference is substantially equal to the converter rated current.

To handle higher grid voltage $\vec{u}_g$, line side converter can be operated in the overmodulation range. For operation in the overmodulation range according to an embodiment, the following strategy can be adopted to modify the current reference for the current control. Referring to FIGS. 2 and 3, the voltage equation can be obtained:

$$\vec{u}_c = \vec{u}_g + \vec{u}_x \quad (1)$$

Normally, $\vec{u}_c$ is estimated rather than being measured due to high frequency switching of the power converter. Moreover, in the overmodulation range $\vec{u}_c$ contains lower order harmonics. Irrespective of linear or overmodulation range $|\vec{u}_c|$ can be given as $$\frac{2}{\pi} V_{dc} m_i$$

as explained before. The equation (1) can be approximated as, $$\vec{u}_1^* = \vec{u}_g + \vec{u}_x \quad (2)$$

Where $\vec{u}_1^*$ is the voltage reference from the converter control block to the PWM block, see FIG. 11. With (2), voltage drop $\vec{u}_x$ can be obtained using the following equations.

$$\vec{u}_x = \vec{i}_c^* \cdot x_s = \vec{u}_1^* - \vec{u}_g \quad (3)$$

Therefore, the current reference can be obtained using the following equations.

$$\vec{i}_c^* = \frac{\vec{u}_1^* - \vec{u}_g}{x_s} \quad (4)$$

The voltage $|\vec{u}_1^*|$ lies between the value of 0.5772 Vdc and 0.6364 Vdc in overmodulation range.

Referring to FIG. 4, the current $\vec{i}_c^*$ is substantially reactive at the end of linear modulation through overmodulation range. The current reference $\vec{i}_c^*$ which is in αβ frame can be converted to dq frame through the grid voltage angle $\gamma_g$. Subsequently, dq current components are filtered and current limited to obtain the modified current references $i_d^m$ and $i_q^m$. Current limits $i_d^{lim}$ and $i_q^{lim}$, in FIG. 12b are dependent on converter current rating as per the following equation:

$$(i_d^{lim})^2 + (i_q^{lim})^2 = (k \times i_c^{rated})^2 \quad (5)$$

where $i_c^{rated}$ is the nominal current rating of the converter and k is the "short time converter current overload factor" which allows the converter to be operated at more than the rated current for a short duration. The factor k depends on given converter hardware ratings and the duration of operation e.g. k could be in the range 1.0-1.2 for a given converter for the short time overload. A higher priority is given to the reactive current over the active current in order to provide a better grid support. Hence, there could be a situation where $i_d^{lim} = k i_c^{rated}$ and $i_q^{lim} = 0$. Take note that normally converter is operated at rated current or below. If the converter current exceeds the current limits, the converter supervision will trip the converter system. Hence, in order to operate the converter in overload condition for short time the converter supervision limits need to be relaxed.

In FIG. 12b apart from $\vec{u}_1^*$ and $\vec{u}_g$, there are two more inputs to the current modification block: (1) grid voltage angle $\gamma_g$ and (2) grid current injection reference $\vec{i}_g^*$. The grid voltage angle $\gamma_g$ is obtained from the PLL based on $\vec{u}_g$, and is used for dq/αβ transformation or vice versa. The grid current injection reference $\vec{i}_g^*$ may be defined by some grid codes or wind farm operator for overvoltage condition. In this situation $\vec{i}_1^m$ may be partially or fully dependent on $\vec{i}_g^*$. However, if there is no such requirement, the current is determined by the method given above. If required, other inputs to the current reference modification block could be measured current signals $\vec{i}_g$ and $\vec{i}_c$. The converter system/hardware parameters such as $x_s$ are also provided to the "current reference modification" block.

Hence, the converter control system continuously monitors the grid voltage $\vec{u}_g$. If the grid voltage $\vec{u}_g$ is in nominal range, the current references are decided as described in FIG. 12a. In case of overvoltage event, if the magnitude of overvoltage is not so high then the current references can be decided based on FIG. 3 or 4. However, if the over voltage can not be handled through the strategy described in FIG. 4 then the converter is operated in overmodulation range and current references are modified as described in FIG. 12b.

Figure 13:
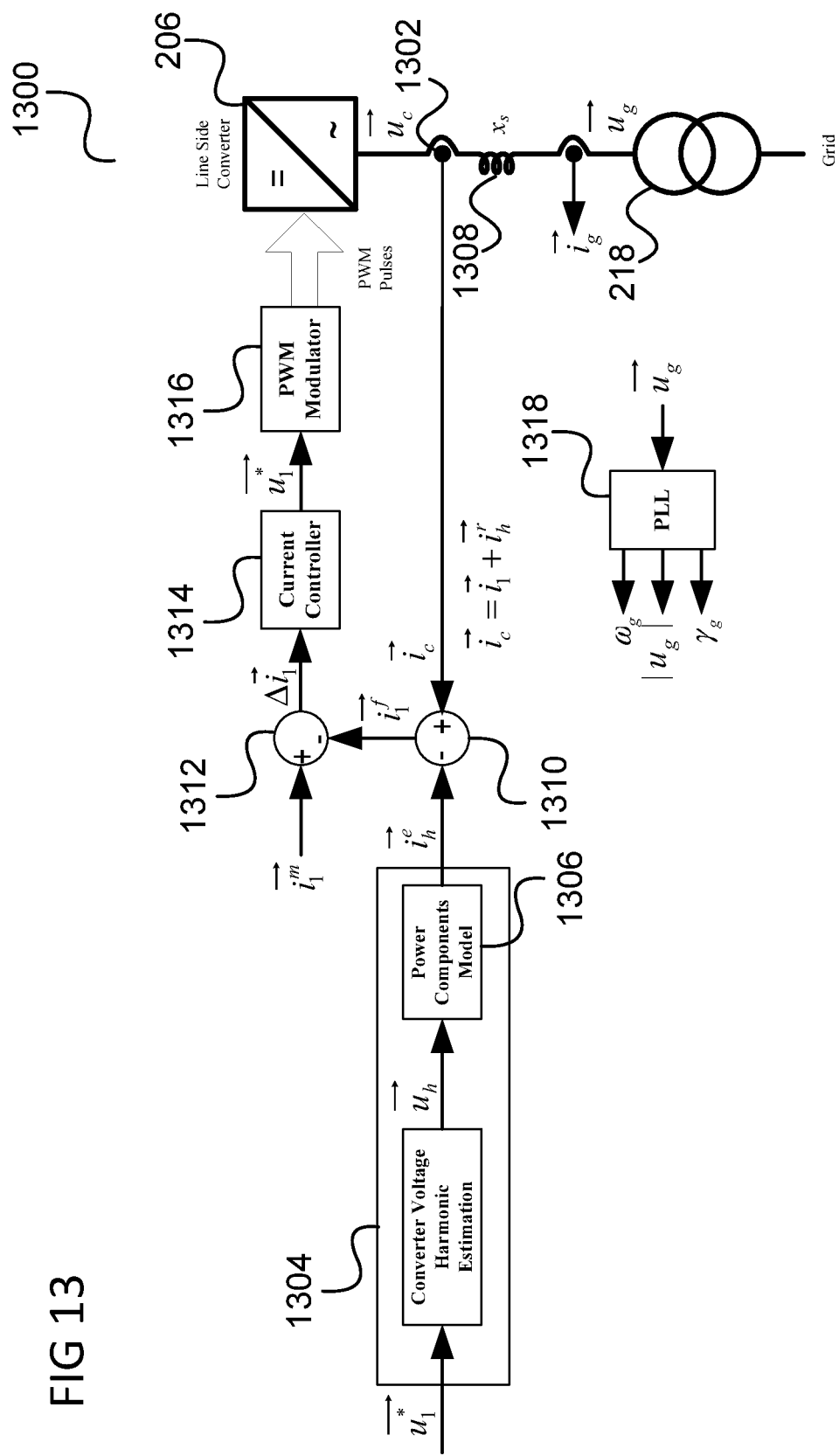
FIG. 13 shows a control system according to an embodiment of the present invention.

FIG. 13 shows a control system 1300 according to one embodiment of the present invention. The control system 1300 comprises a line current signal generating unit 1302 configured to determine a line side current signal $\vec{i}_c$ indicative of a line current occurring at the output of a line side converter 206 connected to the input of a grid transformer 218 through power components; a harmonic current signal estimating unit 1304 configured to estimate a harmonic current signal $\vec{i}_h^p$ indicative of an harmonic current component of the line current; the philosophy to estimate the harmonic current signal $\vec{i}_h^e$ is described here. Referring to FIG. 7, after the modulation index of 0.907 the line side converter 206 operates in overmodulation range till six step operation corresponding to the area between the two squares. There are many methods of operating a converter in overmodulation range such as those described in [i]-[iii]. As mentioned before, low order harmonics are generated when we operate a converter in overmodulation range. The magnitudes of these harmonics vary from method to method. Nevertheless, for a given overmodulation technique one can easily determine the harmonic content $\vec{u}_h$ for a fundamental voltage reference $\vec{u}_1^*$. A power components model 1306 used by the harmonic current signal estimating unit 1304 signifies the equivalent circuit impedance model between the line side converter 206 and the grid transformer 218 which mainly include grid chokes 1308 and grid filter components such as capacitors. Necessary simplifications can be made to this model if required.

With the knowledge of $\vec{u}_h$ and power components model 1306, the harmonic current $\vec{i}_h^e$, can be easily estimated. The converter output current $\vec{i}_c$ consists of two main components i.e. the actual fundamental current component $\vec{i}_1$ and actual harmonic current component $\vec{i}_h^r$. Ideally, estimated harmonic current $\vec{i}_h^e$ is equal to actual harmonic current $\vec{i}_h^r$. In linear mode of operation both of them will be zero and in overmodulation range they will be substantially equal i.e. $\vec{i}_h^e \approx \vec{i}_h^r$. A subtracting unit 1310 configured to subtract the harmonic current component signal $\vec{i}_h^e$ from the line current signal $\vec{i}_c$ to obtain a harmonic current free line current signal $\vec{i}_1^f$ which is substantially equal to actual line current $\vec{i}_1$ at fundamental frequency; a line current error determining unit 1312 configured to determine a line current error $\Delta \vec{i}_1$ between the harmonic current free line current signal $\vec{i}_1^f$ and a line current reference $\vec{i}_1^m$ which is determined as discussed above with reference to FIG. 12b; wherein the current control unit 1314 is configured to control, based on the determined line current error $\Delta \vec{i}_1$, the line side converter 206 by means of a PWM modulator 1316 such that the line current error $\Delta \vec{i}_1$ is partly or fully compensated. The controller, i.e. the current control unit 1314, produces the voltage reference signal $\vec{u}_1^*$ for the converter which is eventually fed to the PWM modulator to produce the PWM signals for the power converter.

Similarly to the control system 1100 explained above with reference to FIG. 11, the control system 1300 includes a PLL 1318 to determine grid voltage angular speed ($\omega_g$), grid voltage angle ($\gamma_g$) and grid voltage magnitude ($|u_g|$).

Figure 14:
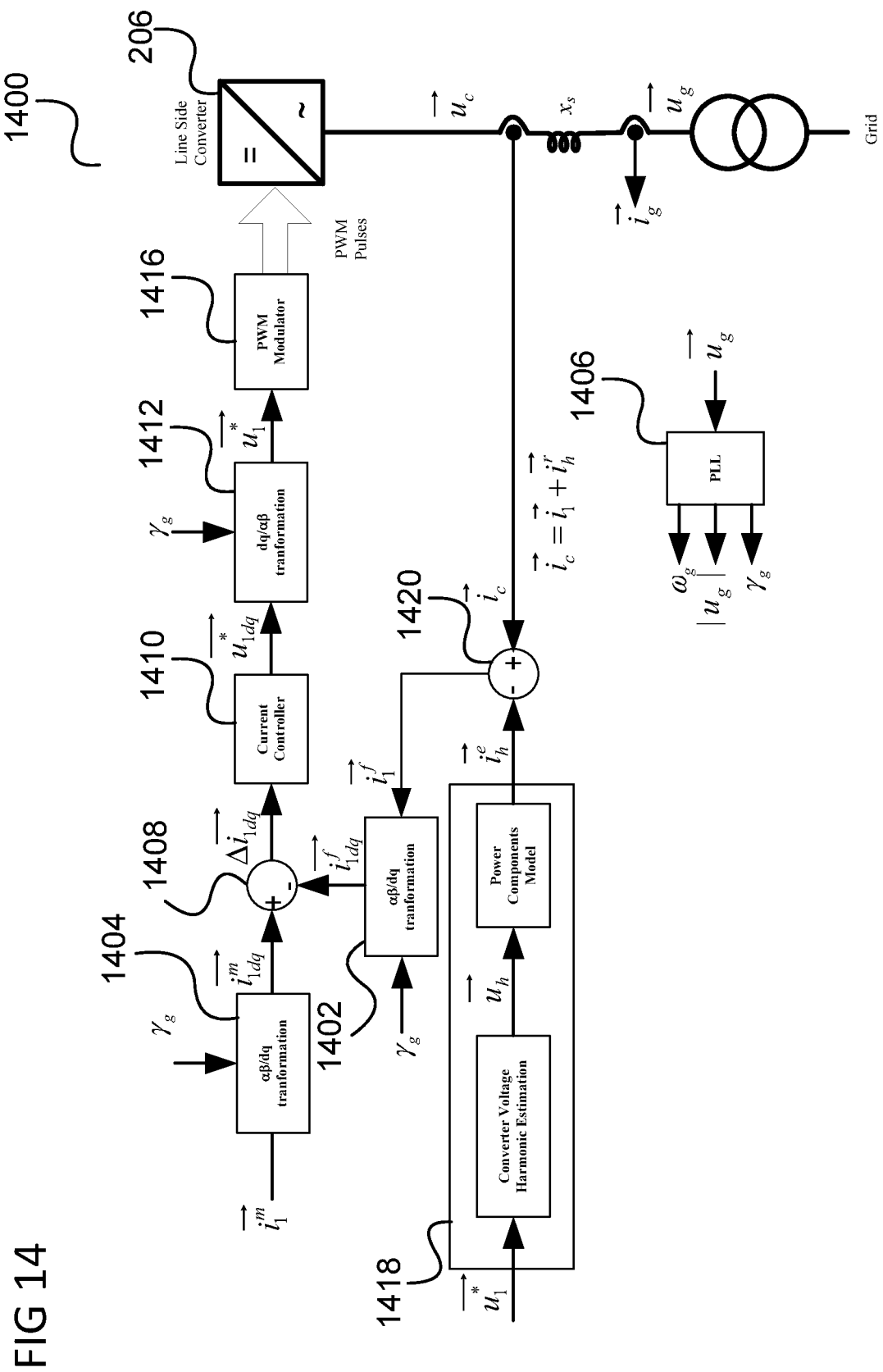
FIG. 14 shows a control system according to an embodiment of the present invention.
Figure 15:
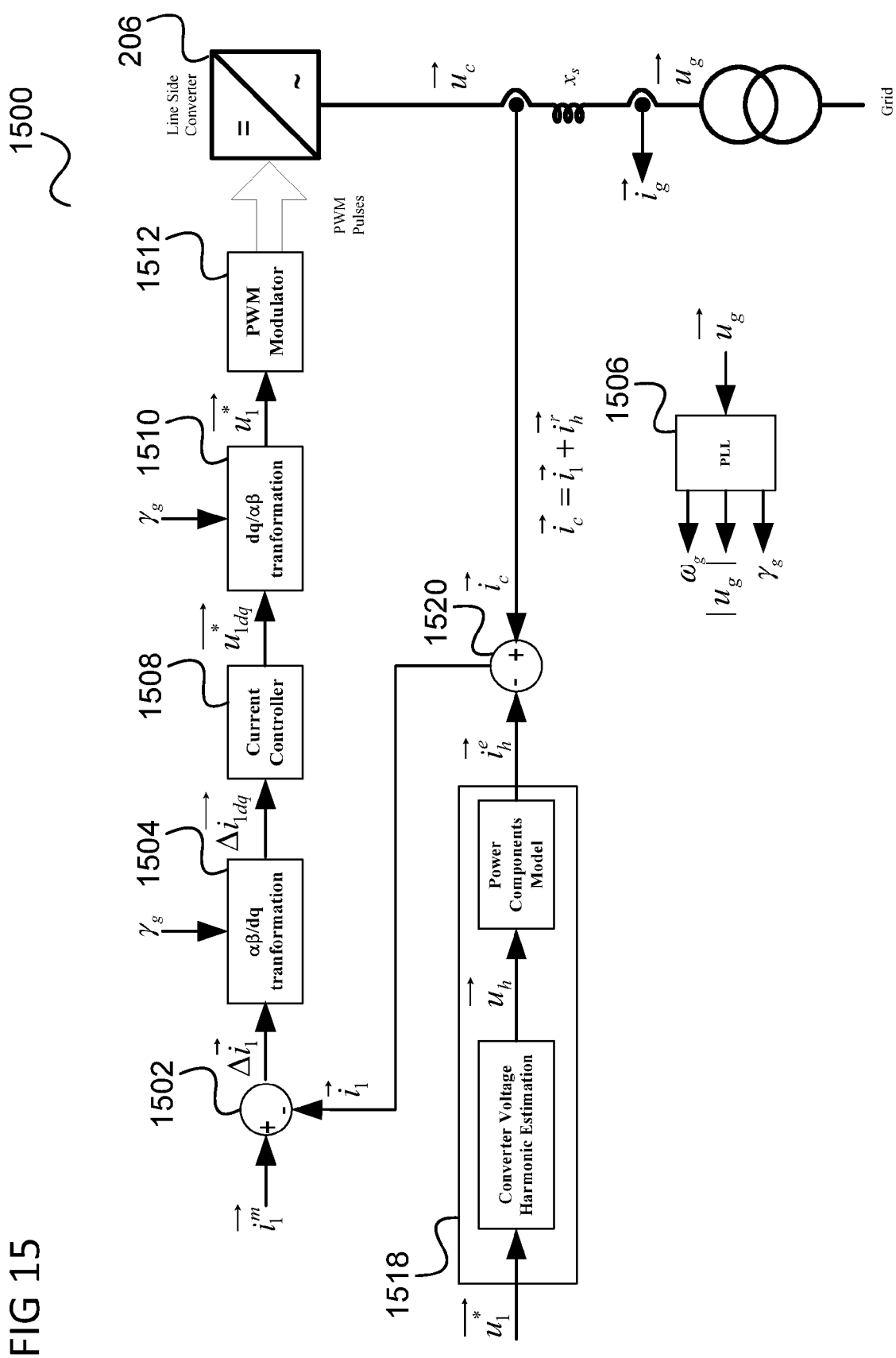
FIG. 15 shows a control system according to an embodiment of the present invention.

The control system 1300 shown in FIG. 13 is an implementation in the stationary frame. It is also possible to implement the control system 1300 in rotating frame. FIGS. 14 and 15 show exemplary implementations in the rotating/dq frame.

FIG. 14 shows a control system 1400 according to an embodiment.

Similarly to the control system 1300, the control system 1400 includes a harmonic current signal estimating unit 1418 configured to estimate a harmonic current signal $\vec{i}_h^e$ which is subtracted by a first subtracting unit 1420 from the line current signal $\vec{i}_c$ to obtain a harmonic current free line current signal $\vec{i}_1^f$.

In the control system 1400 shown in FIG. 14, the current signals $\vec{i}_1^f$ and $\vec{i}_1^m$ are converted to dq reference i.e. $\vec{i}_{1dq}^f(\vec{i}_{1d}^f, \vec{i}_{1q}^f)$ and $\vec{i}_{1dq}^m(\vec{i}_{1d}^m, \vec{i}_{1q}^m)$ respectively through αβ→dq transformation by a first conversion unit 1402 and a second conversion unit 1404, respectively. The grid voltage angle $\gamma_g$ which is obtained through a phase lock loop (PLL) 1406 is used for this transformation. The difference of $\vec{i}_{1dq}^m$ and $\vec{i}_{1dq}^f$ determined by a second subtracting unit 1408 is used to obtain the current error $\Delta \vec{i}_{1dq}(\Delta \vec{i}_{1d}, \Delta \vec{i}_{1q})$ which is fed to a current controller 1410 (e.g. a PI controller). The output of the current controller 1410 is the converter voltage reference in dq frame $\vec{u}_{1dq}^*$ which is converted by a third conversion unit 1412 to a voltage in αβ frame $\vec{u}_1^*$ through dq→αβ transformation. The voltage in αβ frame $\vec{u}_1^*$ is used to control the line side converter 206 by means of a PWM modulator 1416.

FIG. 15 shows a control system 1500 according to an embodiment.

Similarly to the control system 1400, the control system 1500 includes a harmonic current signal estimating unit 1518 configured to estimate a harmonic current signal $\vec{i}_h^e$ which is subtracted by a first subtracting unit 1520 from the line current signal $\vec{i}_c$ to obtain a harmonic current free line current signal $\vec{i}_1^f$.

The difference of $\vec{i}_1^m$ and $\vec{i}_1^f$ determined by a second subtracting unit 1502 is converted to dq frame by a first conversion unit 1504. The grid voltage angle $\gamma_g$ which is obtained through a phase lock loop (PLL) 1506 is used for this transformation.

The result of the conversion $\Delta \vec{i}_{1dq}(\Delta \vec{i}_{1d}, \Delta \vec{i}_{1q})$ is fed to a current controller 1508. The output of the current controller 1508 is the converter voltage reference in dq frame $\vec{u}_{1dq}^*$ which is converted by a second conversion unit 1510 to a voltage in αβ frame $\vec{u}_1^*$ through dq→αβ transformation. The voltage in αβ frame $\vec{u}_1^*$ used to control the line side converter 206 by means of a PWM modulator 1512.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The following publications have been cited in the above description:

[i] J. Holtz, W. Lotzkat, and A. M Khambadkone, "On continuous control of pwm inverters in overmodulation range including six-step," IEEE Transaction on Power Electronics, vol. 8, pp. 546-553, 1993.

[ii] D.-C. Lee and G.-M. Lee, "A novel overmodulation technique for space-vector pwm inverters," IEEE Trans. on Power Electronics, vol. 13, no. 6, pp. 1144-1151, 1998.

[iii] A. Tripathi, A. Khambadkone, and S. Panda, "Direct method of overmodulation with integrated closed loop stator flux vector control," IEEE Transactions on Power Electronics, vol. 20, pp. 1161-1168, September 2005.

[iv] A. Tripathi, A. M. Khambadkone, and S. K. Panda, "Stator flux based space vector modulation and closed loop control of the stator flux vector in overmodulation into six-step mode," IEEE Transaction on Power Electronics, vol. 19, pp. 775-782, May 2004"

What is claimed is:

1. A method of operating a wind turbine comprising a power generator, a generator side converter connected to the power generator, a line side converter connected to a power grid through power components, and a dc-link connected between the generator side converter and the line side converter, the method comprising:
upon detecting an overvoltage event of the power grid based on a measured grid voltage, operating the line side converter in an overmodulation range for at least part of the duration of the overvoltage event.

2. The method according to claim 1, wherein, while operating in the overmodulation range, the line side converter is operated in a nonlinear region extending between an upper end of a linear modulation range and six step operation.

3. The method according to claim 2, wherein, while operating in the overmodulation range, more than 90% and less than 100% of an available dc-link voltage is utilized by the line side converter control.

4. The method according to claim 1, further comprising:
calculating current reference signals for current control of the line side converter; and
modifying, while operating in the overmodulation range, the current reference signals to generate a line current reference signal based on at least one of the following: the grid voltage, a converter reference voltage vector, grid current injection requirements, an active power requirement, and a reactive power requirement, wherein the line side converter is controlled based on the line current reference signal.

5. The method according to claim 1, wherein, while operating in the overmodulation range, the line side converter is operated using vector based control.

6. The method according to claim 1, wherein the line side converter is operated using proportional-integral (PI) current control while operating in the overmodulation range.

7. The method according to claim 6, further comprising:
obtaining a line side current signal indicative of a line current occurring at the output terminals of a line side converter connected to a grid transformer through the power components;
generating a harmonic current component signal indicative of an estimated harmonic current component present in the line current;
subtracting the harmonic current component signal from the obtained line side current signal to produce a second line current signal that is substantially free from the harmonic current component;
determining a line current error between the second line current signal and a line current reference signal that is generated based on the detected overvoltage event;
controlling, based on the determined line current error, the line side converter such that the line current error is partly or fully compensated.

8. The method of claim 1, wherein an overvoltage event is characterized by the line side converter being unable to output, while operating in a linear operating range and based on a voltage of the dc-link, sufficient converter current and voltage to balance the measured grid voltage.

9. A system of operating a wind turbine comprising a power generator, a generator side converter connected to the power generator, a line side converter connected to a power grid through power components, and a dc-link connected between the generator side converter and the line side converter, the system comprising:
a monitoring unit configured to detect an overvoltage event of the power grid based on a measured grid voltage; and
a controlling unit connected to the monitoring unit and configured to, upon detection of an overvoltage event, operate the line side converter in an overmodulation range for at least part of the duration of the overvoltage event.

10. The system according to claim 9, wherein the controlling unit is configured to, while operating the line side converter in the overmodulation range, operate the line side converter in a non-linear operation range extending between an upper end of a linear operation range and six step operation.

11. The system according to claim 10, wherein the controlling unit is configured to, while operating the line side converter; in the overmodulation range, operating the line side converter such that more than 90% and less than 100% of an available dc-link voltage is utilized by the line side converter control.

12. The system according to claim 9, further comprising:
a modification unit configured to modify current reference signals to generate a line current reference signal based on at least one of the following: the grid voltage, a grid current, an active power requirement, and a reactive power requirement.

13. The system according to claim 9, wherein the controlling unit is configured to, while operating the line side converter in the overmodulation range, operate the line side converter using vector based control.

14. The system according to claim 9 wherein the controlling unit is configured to, while operating the line side converter in the overmodulation range, operate the line side converter using proportional-integral (PI) current control.

15. The system according to claim 14, wherein the controlling unit comprises:
a line current signal obtaining unit configured to obtain a line current signal indicative of a line current occurring at output terminals of the line side converter, the line side converter connected to a grid transformer through the power components;
a harmonic current component signal estimating unit configured to generate a harmonic current component signal indicative of an estimated harmonic current component present in the line current;
a subtracting unit configured to subtract the harmonic current component signal from the obtained line current signal to produce a second line current signal that is substantially free from the harmonic current component;
a line current error determining unit configured to determine a line current error between the second line current signal and a line current reference signal that is generated based on the detected overvoltage event;
wherein the controlling unit is configured to control, based on the determined line current error, the line side converter such that the line current error is partly or fully compensated.

16. A wind turbine operatively connected with a power grid, the wind turbine comprising:
a power generator;
a generator side converter connected with the power generator;
a line side converter connected through power components to the power grid;
a dc-link connected between the generator side converter and the line side converter; and
a control arrangement coupled with the line side converter and configured to:
upon detecting an overvoltage event of the power grid based on a measured grid voltage, operate the line side converter in an overmodulation range for at least part of the duration of the overvoltage event.

17. The wind turbine of claim 16, wherein the control arrangement is further configured to, while operating the line side converter in the overmodulation range, operate the line side converter in a nonlinear region extending between an upper end of a linear modulation range and six step operation.

18. The wind turbine of claim 17, wherein the control arrangement is further configured to, while operating the line side converter in the overmodulation range, utilize more than 90% and less than 100% of an available dc-link voltage.

19. The wind turbine of claim 16, wherein the control arrangement is further configured to:
- calculate current reference signals for current control of the line side converter; and
- modify, while operating the line side converter in the overmodulation range, the current reference signals to generate a line current reference signal based on at least one of the following: the grid voltage, a converter reference voltage vector, grid current injection requirements, an active power requirement, and a reactive power requirement,
- wherein the line side converter is controlled based on the line current reference signal.

20. The wind turbine of claim 16, wherein the control arrangement is further configured to:
- determine a line current error between the second line current signal and a line current reference signal which is generated based on the detected overvoltage event; and
- control, based on the determined line current error, the line side converter such that the line current error is partly or fully compensated.

* * * * *